No. 651,003.   Patented June 5, 1900.
S. W. BATES.
BICYCLE PUMP.
(Application filed Oct. 12, 1899.)
(No Model.)
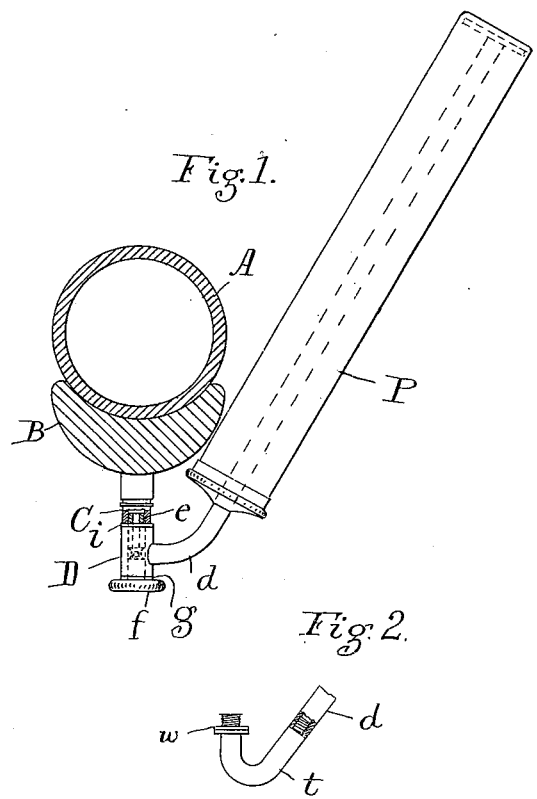
Witnesses:
Frank H. Colley.
Lottie M. Godfrey.
Inventor:
Solomon W. Bates.

UNITED STATES PATENT OFFICE.

SOLOMON W. BATES, OF PORTLAND, MAINE.

BICYCLE-PUMP.

SPECIFICATION forming part of Letters Patent No. 651,003, dated June 5, 1900.

Application filed October 12, 1899. Serial No. 733,381. (No model.)

*To all whom it may concern:*

Be it known that I, SOLOMON W. BATES, a citizen of the United States, residing at Portland, in the county of Cumberland and State of Maine, have invented certain new and useful Improvements in Bicycle-Pumps; and I do hereby declare the following to be a full, clear, and exact description of the invention, such as will enable others skilled in the art to which it appertains to make and use the same.

My invention relates to single-acting hand pumps or inflators for pumping air into pneumatic tires.

The class of air-pumps to which my invention applies are those in common use, having a cylinder which is worked back and forth by hand, with a piston and hollow piston-rod through which the air is forced by the movement of the cylinder, connection being made by means of a rubber hose with the valve of the tire. The objection to these pumps is that the connection being made by means of a flexible tube it requires both hands to operate the pump, the end of the piston being provided with a rest for the fingers, by which the thrust of one hand on the cylinder is counteracted by the other hand, which siezes the end of the piston-rod. In order to screw the rubber hose into the air-valve of the tire, it is necessary or convenient to stoop over and make the connection when the wheel is turned, so that the valve is well down toward the bottom. Thus it is necessary to use both hands with the pump and to stoop over in a tiresome position and also to find a resting-place for the bicycle while the operation is going on.

The operation of inflating a tire with the hand-pump described or any hand-pump now in common use is tiresome and annoying; and it is the object of my invention to simplify the operation and to devise a pump which may be connected and operated with one hand, leaving the other hand free to steady the wheel, and also to permit of its being operated in a standing position. I accomplish this object by means of a V-shaped connection which is temporarily or permanently secured to the end of the piston-rod of the inflator and which turns up and connects, preferably by a swivel screw connection, with the valve of the tire. This connection enables the pump to be worked from above and at one side of the wheel, so that the operator does not have to stoop, and the connection being rigid it may be operated with one hand, the thrust of the pump-cylinder exerting a downward pull on the valve. The pump may be connected with the tire, as well as operated with one hand, if desired, leaving the other hand free to hold the wheel.

I illustrate my invention by means of the accompanying drawings, in which—

Figure 1 shows an elevation of a well-known swivel connection secured permanently to the end of the piston-rod, and Fig. 2 shows a simple V-shaped connection adapted to be connected with the valve and with the end of the piston-rod.

A represents the tire, and B the rim, in section, C being the valve.

D shows a well-known swivel connection, of which $e$ is a hollow central spindle, the upper end of which screws into the valve, while the lower end is provided with a knob $f$, by which it is turned. The spindle is inclosed in a casing which connects with the end of the hollow piston-rod $d$, the end of the latter being bent, so that the whole connection is V-shaped, bringing the pump in a nearly-vertical position when the connection is made. The air enters the spindle $e$ through an annular groove having an opening connecting with the hollow center of the spindle and shown in dotted lines, Fig. 1.

The swivel connection forms no part of my invention and is shown simply by way of illustration. The connection with the valve C and the end of the piston-rod may be made by means of any angular connection which will bring the pump into an approximately-vertical position, so that the thrust of the stroke will exert a pull on the valve-stem or the thrust may be taken by the fingers placed beneath the V-shaped connection, the hand being clasped around the tire.

I have shown in Fig. 2 a simple V-shaped elbow adapted to screw into the valve and into the end of the piston-rod. In this type the connection will first have to be screwed into the valve and then the piston-rod screwed onto the end of the elbow, while in the type shown in Fig. 1 but one connection has to be made. It is obvious that this connection may be made permanently as a part of the piston-rod, as in Fig. 1, or adapted to screw into it, as in Fig. 2. An air-pump made on this plan has the advantage of simplicity and compactness, and, as already pointed out, it may be connected and operated with one hand and in a standing position.

In connecting and operating the pump the operator may stand on either side of the wheel or astride of it at will.

I claim—

The herein-described hand-pump for inflating pneumatic tires consisting of a cylinder, a piston and a hollow piston-rod therefor, the said piston-rod having on the end thereof a V-shaped rigid connection adapted to make a tight joint with the tire-valve.

In testimony whereof I affix my signature in presence of two witnesses.

SOLOMON W. BATES.

Witnesses:
 JOHN T. EUSTIS,
 FLORENCE H. MERRILL.